(12) United States Patent
Urushiyama et al.

(10) Patent No.: US 7,240,959 B2
(45) Date of Patent: Jul. 10, 2007

(54) APPARATUS FOR CONTROLLING VEHICLE BODY RIGIDITY

(75) Inventors: Yuta Urushiyama, Saitama (JP); Shunji Suzuki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 366 days.

(21) Appl. No.: 10/900,286

(22) Filed: Jul. 28, 2004

(65) Prior Publication Data

US 2005/0087972 A1 Apr. 28, 2005

(30) Foreign Application Priority Data

Oct. 23, 2003 (JP) ............................. 2003-362909

(51) Int. Cl.
*B60R 19/02* (2006.01)
(52) U.S. Cl. ................................. 296/187.03
(58) Field of Classification Search ..................... None
See application file for complete search history.

(56) References Cited

U.S. PATENT DOCUMENTS

| 6,286,895 | B1 * | 9/2001 | Urushiyama et al. .. 296/187.03 |
| 6,343,820 | B1 * | 2/2002 | Pedersen ..................... 293/102 |
| 6,767,650 | B2 * | 7/2004 | Hausberger et al. ........ 428/598 |
| 6,893,062 | B2 * | 5/2005 | Amano et al. .............. 293/102 |
| 6,971,690 | B2 * | 12/2005 | Evans et al. ................. 293/102 |
| 7,090,288 | B2 * | 8/2006 | Suzuki et al. .......... 296/187.09 |
| 7,097,222 | B2 * | 8/2006 | Ran ........................... 293/137 |
| 2001/0054826 | A1 * | 12/2001 | Hirota ......................... 293/102 |
| 2005/0012317 | A1 * | 1/2005 | Taya et al. ................... 280/784 |
| 2005/0088011 | A1 * | 4/2005 | Suzuki et al. .......... 296/187.03 |
| 2006/0226665 | A1 * | 10/2006 | Kwok ......................... 293/155 |

FOREIGN PATENT DOCUMENTS

JP 11-291951 10/1999

\* cited by examiner

*Primary Examiner*—H Gutman
(74) *Attorney, Agent, or Firm*—Arent Fox LLP

(57) ABSTRACT

A vehicle body rigidity control apparatus is equipped with a U-shape member substantially becoming a U-shape, a base member for supporting both ends of the U-shape member, and a constraint element for constraining a deformation of the U-shape member in a substantially orthogonal direction for a collision load and releasing the constraint.

9 Claims, 8 Drawing Sheets

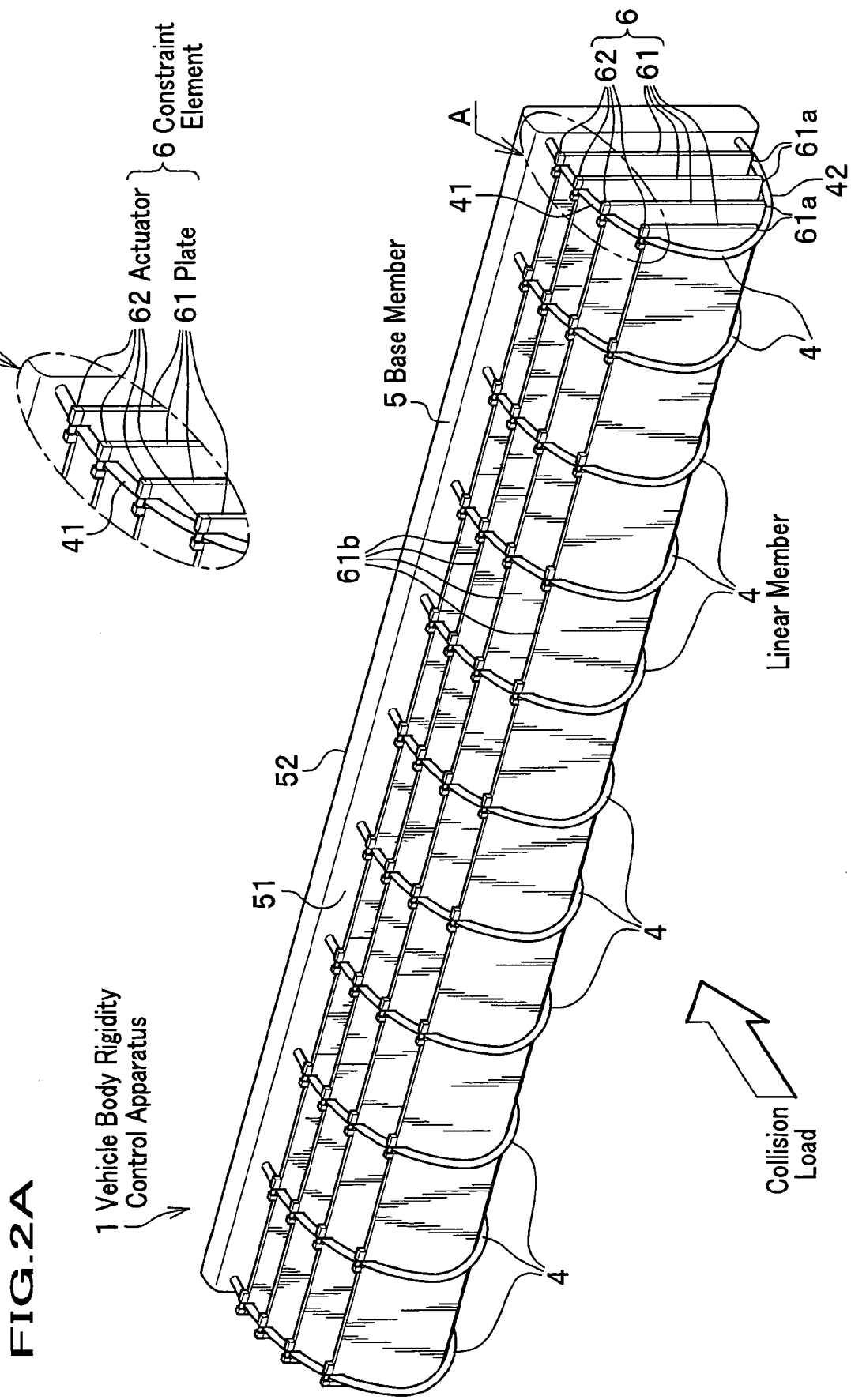

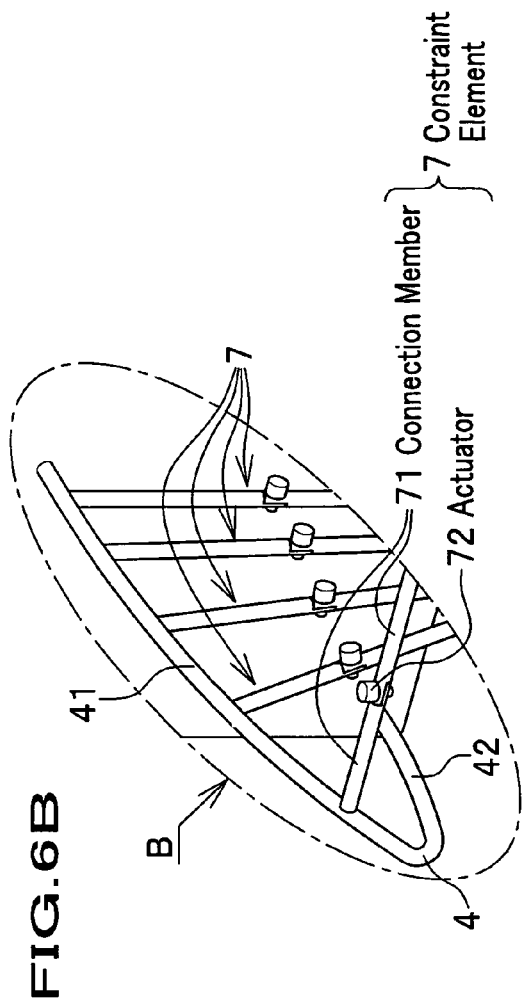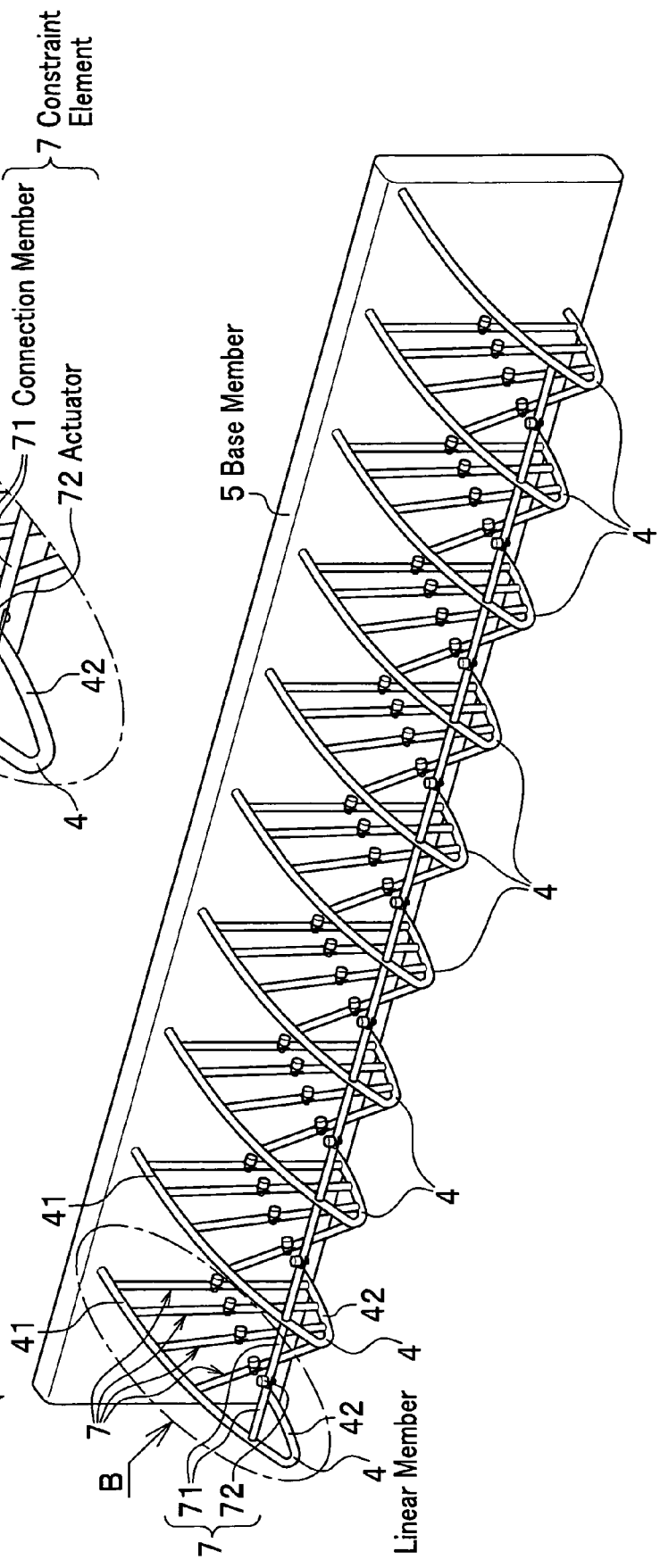

APPARATUS FOR CONTROLLING VEHICLE BODY RIGIDITY

BACKGROUND OF THE INVENTION

1. Field of the Invention

The present invention relates to a vehicle body rigidity control apparatus for controlling rigidity of a vehicle body frame and the like so as to be able to obtain an adequate reactive force load, depending on a collision pattern and a collision object in a vehicle of a collision shock absorption structure.

2. Description of the Related Art

Conventionally, as a vehicle body rigidity control apparatus, there is one where rigidity of side frames to handle different collision patterns is switched over by adding resistant/promotive force for a collision load received from front of a vehicle to the side frames through piezoelectric actuators, which are provided at the side frames arranged at left/right of the vehicle (see paraphrases 0010 to 0017 and FIGS. 2 to 5 in Japanese Patent Laid-Open Publication Hei 11-291951). To be more precise, the apparatus makes the rigidity of the side frames low in a collision pattern (full-wrap collision) where a front face of the vehicle body totally collides; makes the rigidity of the side frames high in another collision pattern (offset pattern) where the collision load concentrates on one side frame; and thereby is designed to be a structure where optimum shock absorption in both collision patterns is made.

In addition, in such the vehicle body rigidity control apparatus it is also possible to control reactive force given to an object by changing the rigidity of the vehicle body, depending on not only collision patterns such as the full-wrap collision, the offset collision, and the like; but also sizes of a collision object.

However, larger power is necessary for actuating the piezoelectric actuator in order to generate the force for resisting the collision load, that is, force for directly receiving the collision load in the structure described above. Therefore, there occur problems of enlargement of the piezoelectric actuators themselves and enlargement of a battery, which supplies the power to the piezoelectric actuators.

Consequently, is strongly requested a vehicle body rigidity control apparatus that can control the rigidity of the vehicle body by smaller force.

SUMMARY OF THE INVENTION

A vehicle body rigidity control apparatus related to a first aspect of the present invention for solving the problems described above comprises a U-shape member of a substantially U-letter shape, a base member for supporting both ends of the U-shape member, and a constraint element for constraining a deformation of the U-shape member in a substantially orthogonal direction for a collision load and releasing the constraint.

Here, the "U-shape member" may be formed by bending any member, which is formed into a long form such as a linear form, a bar form, and a strip form, like a U-shape; and also by combining a plurality of members.

In accordance with the first aspect of the vehicle body rigidity control apparatus, when the collision load is added to the U-shape member, it results in buckling in a multiple-deformation mode with a plurality of bellies by being constrained by the constraint element, and thereby rigidity of the U-shape member becomes high. In addition, when the collision load is added to the U-shape member, it results in buckling in a primary deformation mode with one belly by releasing the constraint of the constraint element, and thereby the rigidity thereof becomes low.

A second aspect of the vehicle body rigidity control apparatus is the apparatus described in the first aspect that comprises a plurality of the U-shape members, wherein the constraint element comprises a plate-form member, whose one end is joined to the U-shape members, and an actuator for connecting the other end of the plate-form member to the U-shape members and releasing the connection, and wherein the plate-form member is arranged inside the U-shape members and.

In accordance with the second aspect of the vehicle body rigidity control apparatus, by connecting the other end of the plate-form member and the U-shape members by the actuator, a deformation of the U-shape members in a substantially orthogonal direction for a collision load is constrained by the plate-form member, the U-shape members buckle in the multiple-deformation mode with a plurality of bellies at the time of a collision, and thereby rigidity thereof becomes high. In addition, with releasing the connection of the other end of the plate-form member and the U-shape members by the actuator, the U-shape members become not constrained by the plate-form member, thereby buckle in the primary deformation mode, and the rigidity thereof becomes low.

A third aspect of the vehicle body rigidity control apparatus is the apparatus described in the first aspect that comprises a plurality of the U-shape members, wherein the constraint element comprises two connection members whose one ends are joined to two neighboring U-shape members, respectively, and an actuator for mutually connecting the other ends of the two connection members and releasing the connection.

In accordance with the third aspect of the vehicle body rigidity control apparatus, by mutually connecting the connection members by the actuator, the two U-shape members mutually are constrained, buckle in the multiple-deformation mode at the time of a collision, rigidity thereof becomes high. In addition, by releasing the mutual connection of the connection members by the actuator, both of the two U-shape members become not constrained, thereby buckle in the primary deformation mode, and the rigidity thereof becomes low.

A fourth aspect of the vehicle body rigidity control apparatus is the apparatus of any of the aspects 1 to 3, wherein the U-shape member is comprised of a shape memory alloy.

Here, the "shape memory alloy" has a property that a buckling load and strain energy value thereof largely differ due to length, compared to aluminum alloys and steel-based materials. To be more precise, although when the shape memory alloy is not less than a predetermined value in length thereof, it has a property that the buckling load reaches peak and then lowers in buckling same as the aluminum alloys and the steel-based materials, the shape memory alloy has another property that the buckling load rises again after the buckling in a case that the length is less than the predetermined value. The shape memory alloy is a material (material that yields in a low stress, is plastically deformed during a constant strain, then is again elastically deformed, the stress rises, and again a yield point appears) having a stress-strain relationship of two stages. Therefore, when the length is less than the predetermined value, the stress-strain relationship of the second stage has a large influence and the rise of the buckling load occurs.

Because if utilizing such the shape memory alloy for the present invention, a portion of a buckling deformation is in a longest state in a case that the U-shape member is not constrained, the U-shape member buckles by a smaller load. In addition, because when dividing the portion of the buckling deformation and shortening it till the predetermined value by constraining an arbitrary position of the U-shape member, the buckling load again rises after the buckling, the U-shape member results in buckling by a far larger load than the smaller load.

In accordance with the fourth aspect of the vehicle body rigidity control apparatus, because the U-shape member is comprised of the shape memory alloy, it results in having a buckling load in proportion to Young's modulus and a yield stress of the first stage in being deformed at a longer pitch (for example, the primary deformation mode), and a high buckling load in proportion to a yield stress of the second stage after the first buckling in being deformed at a shorter pitch (for example, the multiple-deformation mode). Thus a large difference can be provided between the buckling loads in the U-shape member deformed at the longer pitch (for example, the primary deformation mode) and the shorter pitch (for example, the multiple-deformation mode). In other words, because the buckling loads of the U-shape member can be changed over a wide range, the rigidity of a vehicle body can be adjusted over a wide range.

BRIEF DESCRIPTION OF THE DRAWINGS

FIGS. 2A and 2B are perspective views showing the vehicle body rigidity control apparatus of FIG. 1: FIG. 2A is a perspective view showing a whole of the vehicle body rigidity control apparatus; FIG. 2B is a perspective view where constraint elements are enlargedly shown.

FIG. 3A is a perspective view where a movable pin has moved forward; FIG. 3B is a perspective view where the movable pin has moved backward.

FIG. 4A is a side view showing a primary deformation mode; FIG. 4B is a side view showing a secondary deformation mode; FIG. 4C is a side view showing a tertiary deformation mode; FIG. 4D is a side view showing a quartic deformation mode; FIG. 4E is a side view showing a quintic deformation mode.

FIG. 5A is a graph showing the relationship between the displacement and load of a non shape memory alloy material; FIG. 5B is a graph showing the relationship between the displacement and load of a shape memory alloy.

FIGS. 6A and 6B are perspective views showing a vehicle body rigidity control apparatus related to a second embodiment: FIG. 6A is a perspective view showing a whole of the vehicle body rigidity control apparatus; FIG. 6B is a perspective view enlargedly showing constraint elements.

FIG. 7A is a perspective view showing a state where connection members are connected; FIG. 7B is a exploded perspective view showing a state where the connection of the connection members is released.

DESCRIPTION OF THE PREFERRED EMBODIMENTS

First Embodiment

Here will be described a first embodiment of the present invention in detail, referring to FIGS. 1, 2A, and 2B as needed.

Figure 1:
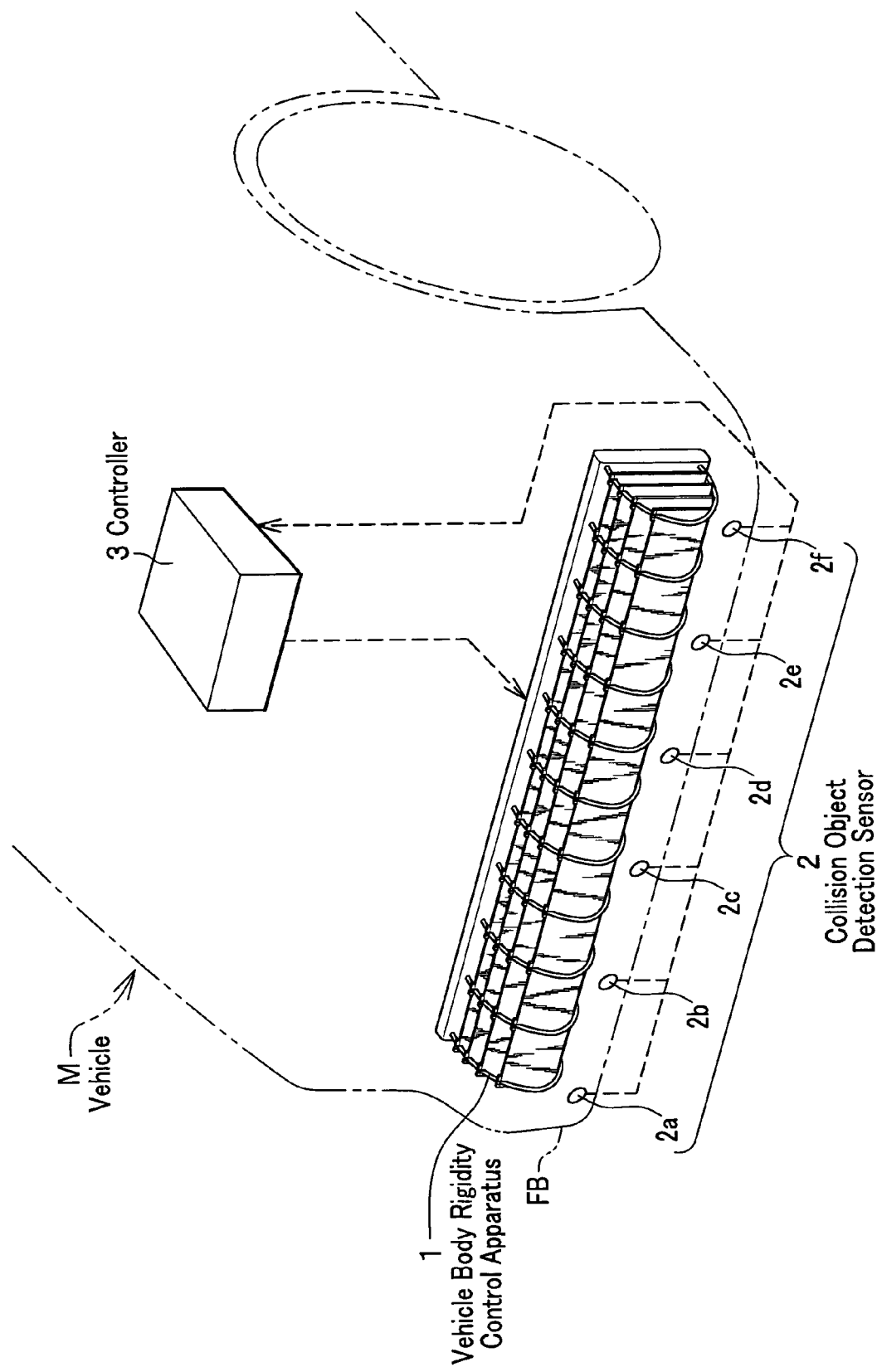
FIG. 1 is a perspective view showing a front portion of a vehicle that comprises a vehicle body rigidity control apparatus related to a first embodiment of the present invention.

As shown in FIG. 1, a vehicle M comprises a vehicle body rigidity control apparatus 1 and collision object detection sensors 2 provided within a front bumper FB thereof, and a controller 3 for controlling the vehicle body rigidity control apparatus 1, based on detection signals from the collision object detection sensors 2. Meanwhile, for convenience, in a description below a plurality of the collision object detection sensors 2 are described from a right side of the vehicle M in order as 2a, 2b, 2c, 2d, 2e, and 2f. In addition, in the description below a front/rear direction, left/right direction, and up/down direction of the vehicle M are simply called as vehicle front/rear direction, vehicle left/right direction, and vehicle up/down direction.

As shown in FIGS. 2A and 2B, the vehicle body rigidity control apparatus 1 mainly comprises a plurality of linear members (U-shape members) 4 bent into a substantially U-shape, a base member 5 for supporting both ends of the linear members 4, and constraint elements 6 for constraining a deformation of the linear members 4 in a substantially orthogonal direction for a collision load and releasing the collision load.

The linear members 4 are comprised of a shape memory alloy, are arranged at a substantially equal distance along a longitudinal direction of the base member 5, and are joined to the base member 5 in a state where both ends of the linear members 4 are arranged so as to be aligned in the up/down direction. That is, the linear members 4 are arranged so that upper portions 41 and lower portions 42 corresponding to both side portions of the U-shape become parallel to the vehicle front/rear direction, respectively.

The base member 5 is a rectangular plate-form member extending in the vehicle left/right direction and both faces 51 and 52 thereof (hereinafter also referred to as "front face 51" and "rear face 52") are arranged so as to be orthogonalized in the vehicle front/rear direction. And in the base member 5 the rear face 52 is joined to a front portion (portion where the front bumper FB is attached) of the vehicle M shown in FIG. 1 in a state that the linear members 4 have been joined to the front face 51. Meanwhile, although in the embodiment, from convenience of a description, the base member 5 is made a member having the orthogonal faces in the vehicle front/rear direction, actually the faces of the base member 5 are formed into a substantially circular form, which is symmetrical in left/right, so as to match an attachment portion of a curved bumper. Therefore, a base member in this case is arranged so that a tangent passing an apex thereof becomes parallel to the vehicle left/right direction.

Each of the constraint elements 6 mainly comprises plates 61, whose lower ends (one ends) 61a are joined to each lower side portion 42 of the linear members 4, and actuators 62 for connecting and releasing upper ends (the other ends) 61b of the plates 61 and each upper side portion 41 of the linear members 4.

Figure 3B:
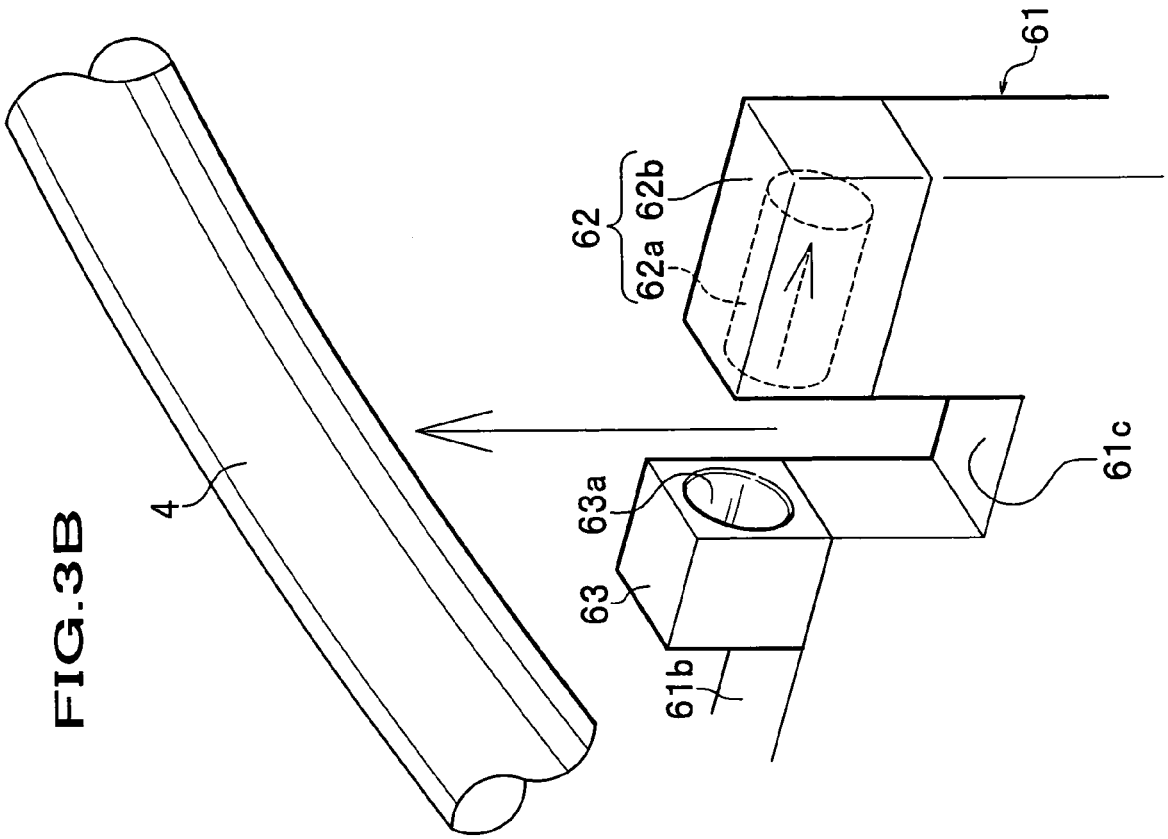
FIGS. 3A and 3B are enlarged perspective views showing a structure in the vicinity of an actuator.
Figure 3A:
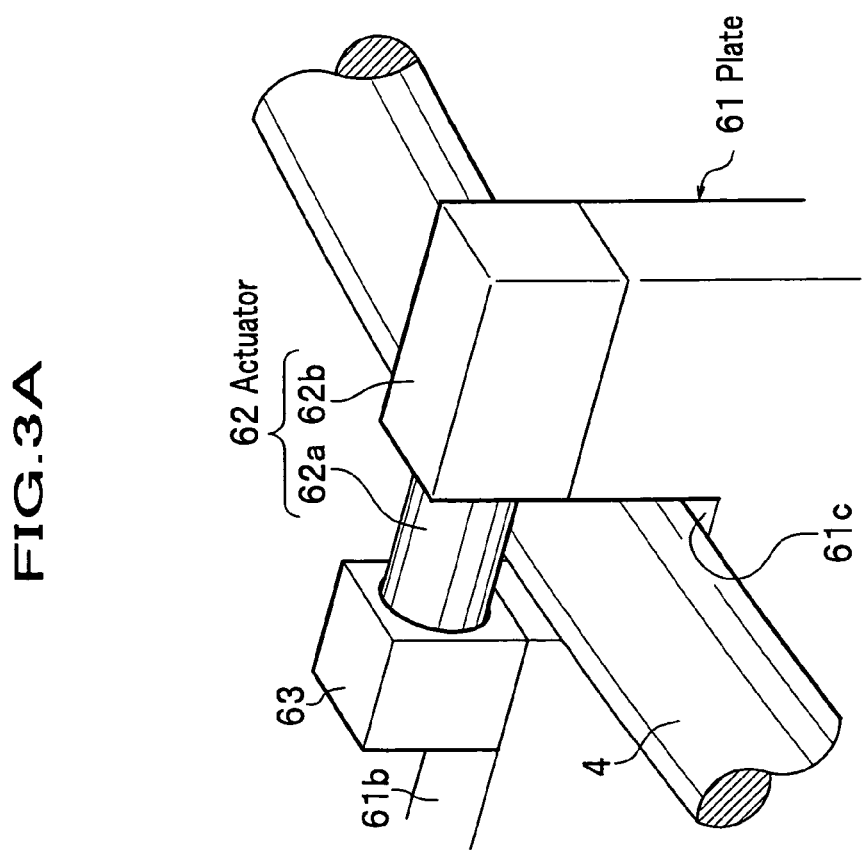

The plates 61 are plate-form members arranged so as to pass inside the plurality of the linear members 4 of a substantially U-shape, and four pieces of the plates 61 are disposed at a substantially equal distance in the front/rear direction in a state where they become substantially parallel to the base member 5. Meanwhile, although in the embodiment a number of the plates 61 is made four, the present invention is not limited thereto and the number may be any. In addition, at the upper ends 61b of the plates 61 are formed a plurality of groove portions 61c (nothing but one illustrated) which the plurality of the linear members 4 can penetrate as enlargedly shown in FIGS. 3A and 3B; to both sides sandwiching each of the groove portions 61c are joined one of the actuators 62 and a concave member 63, which has a hole portion 63a where a movable pin 62a of each of the actuators 62 fits. Meanwhile, the groove portions 61c constrain a deformation in the vehicle left/right direction of the linear members 4 by both sides of side walls thereof and another deformation in the vehicle up/down direction by bottom walls thereof and the movable pins 62a of the actuators 62.

Each of the actuators 62 is a so called magnetic solenoid and mainly comprises the movable pin 62a, which can freely move forward and backward in an axial direction thereof, and a drive portion 62b, which moves the movable pin 62a forward and backward. And each of the actuators 62 moves the movable pin 62a forward by being made ON by the controller 3 (see FIG. 1), thereby closes an opening of the groove 61c, and connects relevant linear member 4 and plate 61. In addition, each of the actuators 62 moves the movable pin 62a backward by being made OFF by the controller 3 (see FIG. 1), thereby opens the opening of the groove 61c, and release the connection of the linear member 4 and the plate 61. Meanwhile, the movable pin 62a that moves forward to close the opening of the groove 61c is designed to be able to solidly constrain a deformation in an up direction of the linear member 4 by engaging the concave member 63.

As shown in FIG. 1, the collision object detection sensors 2a to 2f are something for detecting hardness of a collision object. As the collision object detection sensors 2a to 2f, for example, can be used a camera for detecting the collision object as an image, infrared sensors for detecting a temperature of the collision object, a strain sensor for detecting a strain of a vehicle body at the time of a collision, and the like. In addition, the controller 3 determines the hardness of the collision object, based on outputs (for example, image data, temperatures, strains, and the like) from the collision object detection sensors 2a to 2f, and controls each of the actuators 62 (see FIG. 2) of the vehicle body rigidity control apparatus 1, depending on the hardness of the collision object, a vehicle speed detected by a vehicle speed sensor not shown, and the like. Meanwhile, although in the embodiment the collision object detection sensors 2a to 2f are made something for detecting the hardness of the collision object, the present invention is not limited thereto. For example, as the collision object detection sensors 2a to 2f, may be used a distance sensor, which detects a distance to the collision object with using a laser, an ultrasonic wave, and the like. In this case, for example, rigidity of the vehicle body rigidity control apparatus 1 can be switched over so as to handle the offset collision and full-wrap collision of a vehicle.

In addition, for example, the controller 3 determines that the collision object is large when detection signals are judged to be output from not less than four neighboring sensors out of the collision object detection sensors 2a to 2f; the controller 3 determines that the collision object is small when the detection signals are judged to be output from not more than three neighboring sensors. And the controller 3 controls ON/OFF of a plurality of the actuators 62 (see FIGS. 2A and 2B), depending on the size and hardness of the collision object determined as described above. To be more precise, the controller 3 controls deformation modes of the upper side portion 41 and lower side portion 42 of each of the linear members 4 by appropriately controlling the four actuators 62 arranged in the vicinity of the upper side portion 41 of each of the linear members 4 shown in FIGS. 2A and 2B.

Figure 4C:
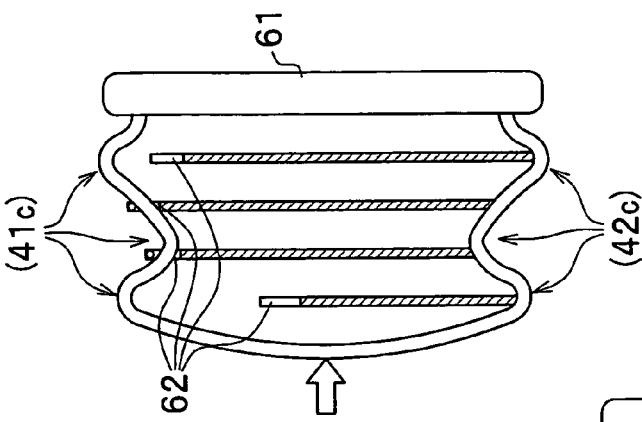
FIGS. 4A to 4E are side views showing deformation modes of a linear member.
Figure 4E:
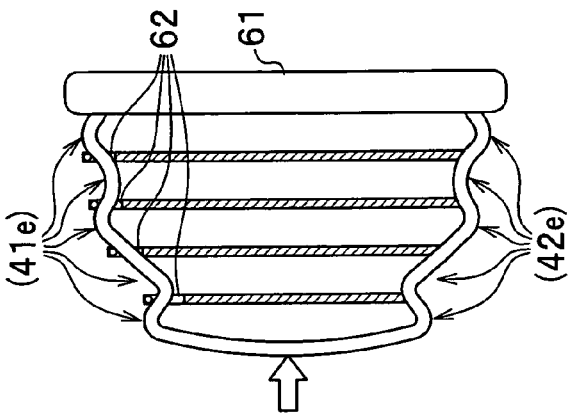
Figure 4B:
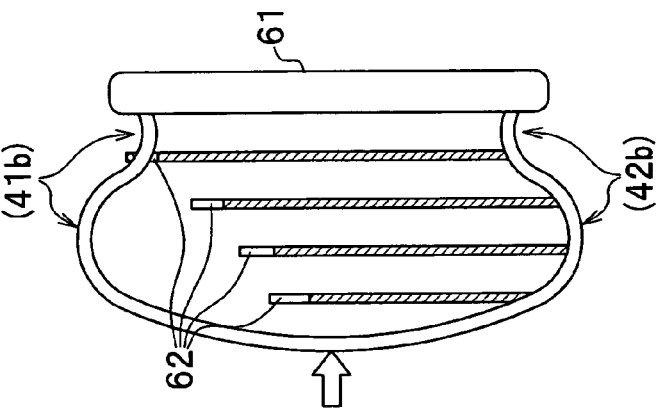
Figure 4D:
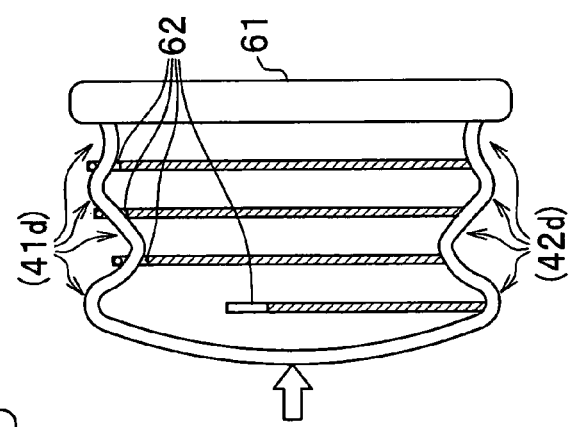
Figure 4A:
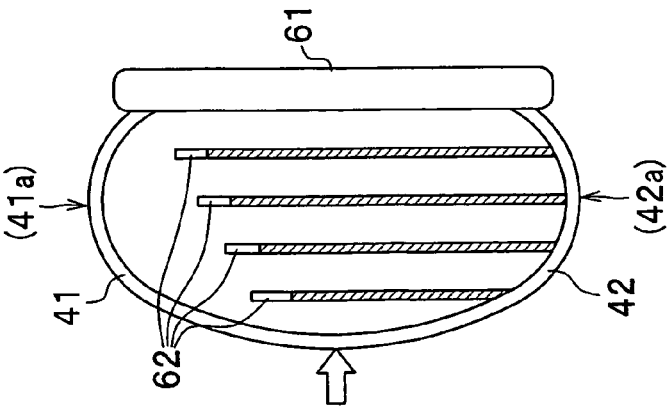

Here, in the deformation modes of the embodiment there are a primary deformation mode where the upper side portion 41 and the lower side portion 42 are deformed and have one belly 41a and 42a, respectively, as shown in FIG. 4A; a secondary deformation mode where the upper side portion 41 and the lower side portion 42 are deformed and have two bellies 41b and 42b, respectively, as shown in FIG. 4B; a tertiary deformation mode where the upper side portion 41 and the lower side portion 42 are deformed and have three bellies 41c and 42c, respectively, as shown in FIG. 4C; a quartic deformation mode where the upper side portion 41 and the lower side portion 42 are deformed and have four bellies 41d and 42d, respectively, as shown in FIG. 4D; and a quintic deformation mode where the upper side portion 41 and the lower side portion 42 are deformed and have five bellies 41e and 42e, respectively, as shown in FIG. 4E.

And out of these deformation modes the primary deformation mode shown in FIG. 4A is switched over by making all of the four actuators 62 OFF; the secondary deformation mode shown in FIG. 4B is switched over by making nothing but one of the four actuators 62 ON; the tertiary deformation mode shown in FIG. 4C is switched over by making nothing but two of the four actuators 62 ON; the quartic deformation mode shown in FIG. 4D is switched over by making nothing but three of the four actuators 62 ON; and the quintic deformation mode shown in FIG. 4E is switched over by making all of the four actuators 62 ON.

Meanwhile, by appropriately switching over the deformation modes of the linear members 4 as described above, the rigidity thereof can be changed. Here will be described a load, which resists a collision load depending on each deformation mode, with using FIGS. 5A and 5B and comparing a shape memory alloy of a material of the embodiment with another material that is a non shape memory alloy.

Figure 5A:
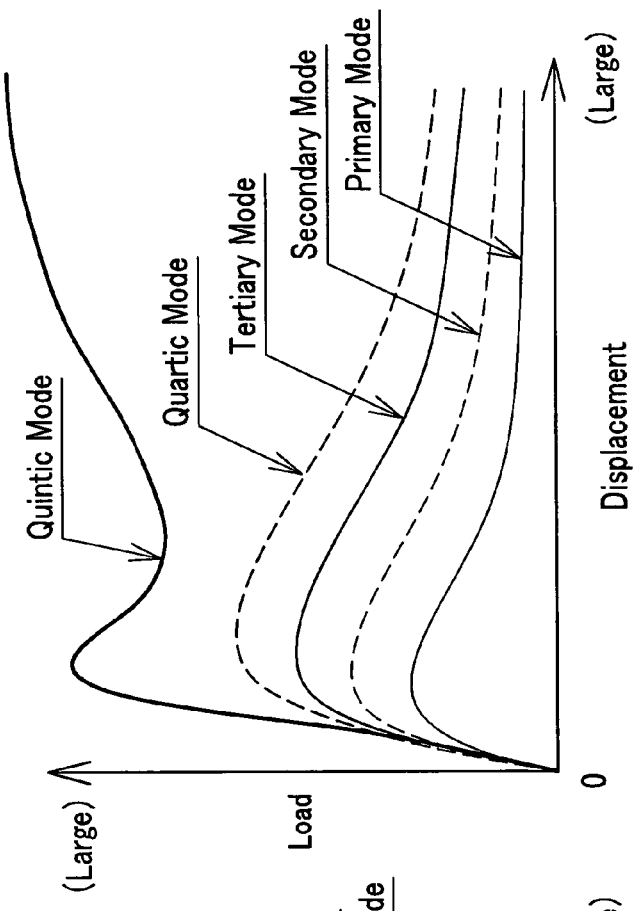
FIGS. 5A and 5B are graphs showing a relationship between a displacement of a linear member and a load resisting a collision load in each deformation mode.
Figure 5B:
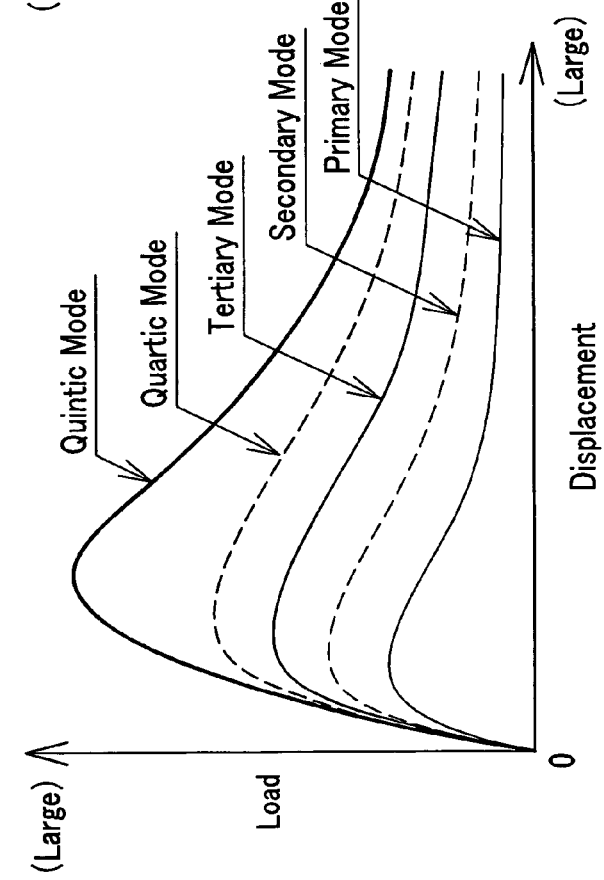

As shown in FIGS. 5A and 5B, it is said in common for any of the materials that the more multiple the deformation mode is made, the more the load resisting the collision load, that is, the rigidity of the linear members 4 can be increased. And remarkably appears a difference between the shape memory alloy of the material of the present invention and another material of non shape memory alloy when the linear member 4 buckles in the quintic deformation mode. In other words, although in the material of the non shape memory alloy shown in FIG. 5A, the load resisting the collision load lowers and lowers after buckling (apex of the graph), in the shape memory alloy shown in 5B the load, which lowers after the buckling, again rises and rises. Thus it turns out that if using the shape memory alloy as in the embodiment, the rigidity in the quintic deformation mode can be dramatically increased, compared to that of the material of the non shape memory alloy.

Next will be described an operation of the vehicle body rigidity control apparatus 1, referring to FIGS. 1, 2A, 2B, and 4A to 4E.

At first will be described a case where the vehicle M collide with a small object (for example, a power pole, a compact vehicle, and the like), referring to FIG. 1. First, when the vehicle M collides with the small collision object, it is detected by, for example, two neighboring collision object detection sensors 2b and 2c out of the collision object detection sensors 2a to 2f and signals thereof are output to the controller 3. And in the controller 3 the detection signals are judged to be output from the two collision object detection sensors 2b and 2c and the collision object is determined to be compact. Thus the controller 3, which has determined the collision object to be compact, makes all of the linear members 4 (see FIGS. 2A and 2B) buckle in the primary deformation mode (see FIG. 4A) by, for example, making all of the actuators 62 OFF while otherwise referring to a vehicle speed.

Subsequently, will be described a case where the vehicle M collides with a large object (for example, a large vehicle), referring to FIG. 1. First, when the vehicle M collides with the large collision object, it is detected by, for example, four neighboring collision object detection sensors 2a to 2d out of the collision object detection sensors 2a to 2f and signals thereof are output to the controller 3. And in the controller 3 the detection signals are judged to be output from the four collision object detection sensors 2a to 2d and the collision object is determined to be large. Thus the controller 3, which has determined the collision object to be large, makes all of the linear members 4 (see FIGS. 2A and 2B) buckle in the quintic deformation mode (see FIG. 4E) by, for example, making all of the actuators 62 ON while otherwise referring to a vehicle speed.

Meanwhile, although in the description all of the linear members 4 are made to buckle in the quintic deformation mode by making all of the actuators 62 ON/OFF, otherwise each of the linear members 4 can be made to buckle in the secondary to quartic deformation modes as shown in FIGS. 4B to 4D by selectively and appropriately making four actuators 62 placed on each of the linear members 4. In addition, it is not required to change the deformation mode of all of the linear members 4 as described above, nothing but linear members 4 corresponding to a collision portion (for example, nothing but linear members 4 of a right half and the like) may be switched over to the deformation mode suitable for the collision object.

In addition, although in the description above each of the actuators 62 is controlled, depending on the size of the collision object, the present invention is not limited thereto, and for example, each of the actuators 62 may be controlled, depending on the hardness of the collision object. Meanwhile, for example, the controller 3 in this case makes all of the linear members 4 buckle in the primary deformation mode by making all of the actuators 62 OFF when the hardness of the collision object, which is detected by the collision object detection sensors 2a to 2f, is judged to be less than a predetermined value; the controller 3 makes all of the linear members 4 buckle in the quintic deformation mode by making all of the actuators 62 ON when the hardness of the collision object is judged to be not less than the predetermined value.

Thus in the first embodiment can be obtained a following effect:

Because the rigidity of a vehicle body can be heightened only by the actuators 62 constraining the linear members 4 from being deformed in a substantially orthogonal direction for a collision load, the rigidity of the vehicle body can be controlled with smaller force than a conventional vehicle body rigidity control apparatus. Therefore, a vehicle body rigidity control apparatus itself, a battery that supplies power to the apparatus, and the like can be made small.

Because the linear members 4 are comprised of the shape memory alloy and thereby, for example, in the quintic deformation mode the load resisting the collision load again rises after the buckling, the rigidity of the vehicle body can be further improved. In addition, even when because the linear members 4 are supported in the vehicle left/right direction by the plates 61, the vehicle M obliquely collides, the linear members 4 are not felled and result in preferably functioning.

Second Embodiment

Here will be described a second embodiment of the vehicle body rigidity control apparatus related to the present invention, referring to FIGS. 6A, 6B, 7A, and 7B. Because in the embodiment the vehicle body rigidity control apparatus 1 of the first embodiment is partially changed, same symbols are appended to components same as in the first embodiment and a description thereof is omitted.

As shown in FIGS. 6A and 6B, a vehicle body rigidity control apparatus 1A comprises the linear members 4 and the base member 5 same as in the first embodiment, and further mainly constraint elements 7 with a structure different from those of the first embodiment. Meanwhile, different from the first embodiment, in the linear members 4 both ends thereof are arranged so as not to align in the up/down direction, to be more precise, the upper side portions 41 thereof are arranged at the left side of a vehicle, and are obliquely joined to the base member 5 so that the lower side portions 42 are located at the right side of the vehicle. In addition, a plurality of the linear members 4 are arranged so that the upper side portion 41 of one linear member 4 out of neighboring linear members 4 is located above the lower side portion 42 of the other linear member 4.

Each of the constraint elements 7 mainly comprises two connection members 71, whose one ends are connected to two neighboring linear members 4, respectively, and an actuator 72 for mutually connecting the other ends of the connection members 71 and releasing them. The connection members 71 become one pair by two and each the pair is spirally arranged between two neighboring linear members 4. To be more precise, each five pairs of the connection members 71 are arranged between the two neighboring linear members 4 so as to gradually arise from a forward pair to backward one: out of them the most forward pair of the connection members 71 is arranged in a state of being substantially parallel to the vehicle left/right direction; the most backward pair of the connection members 71 is arranged in a state of being substantially parallel to the vehicle up/down direction. In other words, each pair of the connection members 71 arranged between the two neighboring linear members 4 are arranged at a substantially equal distance in the vehicle front/rear direction in a state of being substantially parallel to the faces of the base member 5, and across the upper side portion 41 of one linear member 4 and the lower side portion 42 of the other linear member 4 out of the two neighboring linear members 4.

Figure 7B:
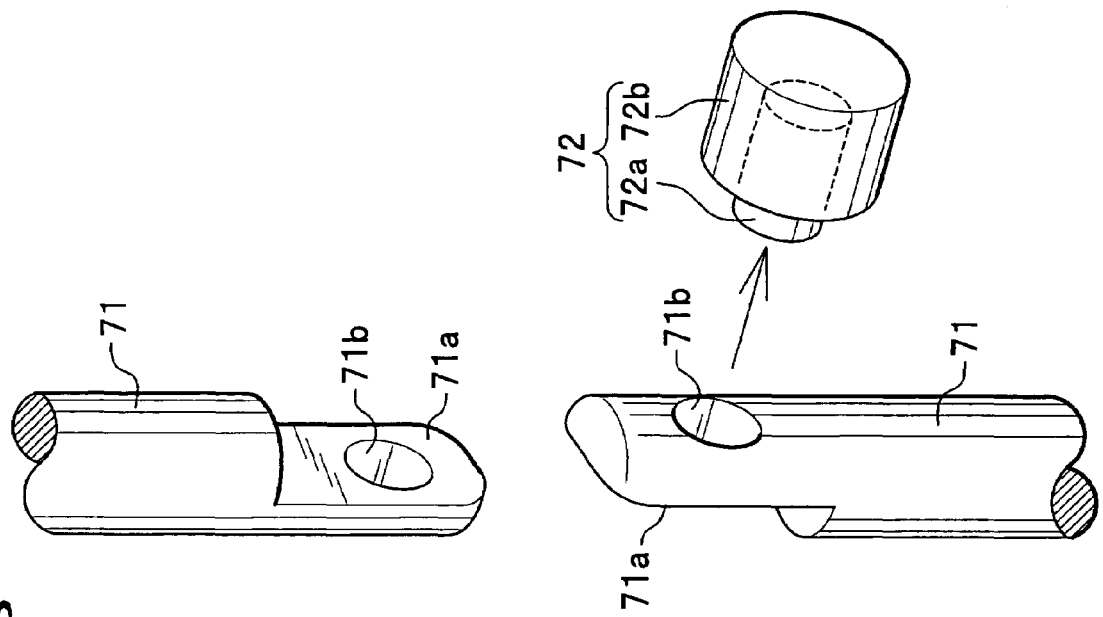
FIGS. 7A and 7B are enlarged perspective views showing a structure in the vicinity of actuators of FIGS. 6A and 6B.
Figure 7A:
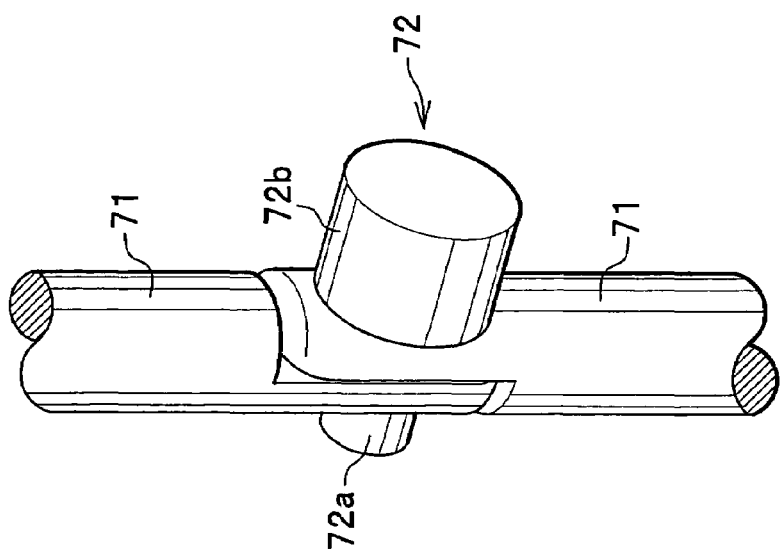

In addition, as shown in FIGS. 7A and 7B, at each of the other ends of two connection members 71 for configuring each pair an overlap portion 71a with a step is formed so that the connection members 71 can overlap in a coaxial state; and at each the overlap portion 71a a through hole 71b, which becomes a penetration state when each the overlap portion 71a overlaps, is formed so as to be orthogonalized in an axial direction of each of the connection members 71.

And a drive portion 72b, which moves a movable pin 72a forward and backward in an axial direction thereof, is joined to the other end of one connection member 71 so that the movable pin 72a of the actuator 72 becomes freely inserted. Meanwhile, the actuator 72 is made ON by the controller 3 (see FIG. 1), thereby moves the movable pin 72a forward, and connects the two connection members 71; on the other hand, the actuator 72 is made OFF by the controller 3, thereby moves the movable pin 72a backward, and releases the two connection members 71.

Next will be described an operation of the vehicle body rigidity control apparatus 1A, referring to FIGS. 1, 4A to 4E, 6A, and 6B.

At first will be described a case where the vehicle M collides with a small object (for example, a power pole, a compact vehicle, and the like), referring to FIG. 1. First, when the vehicle M collides with the small collision object, it is detected by, for example, two neighboring collision object detection sensors 2b and 2c out of the collision object detection sensors 2a to 2f and signals thereof are output to the controller 3. And in the controller 3 the detection signals are judged to be output from the two collision object detection sensors 2b and 2c and the collision object is determined to be compact. Thus the controller 3, which has determined the collision object to be compact, makes all of the linear members 4 buckle in the primary deformation mode (see FIG. 4A) by, for example, making nothing but the most forward actuator 72 shown in FIGS. 6A and 6B ON while otherwise referring to a vehicle speed. Meanwhile, although when making all of the linear members 4 buckle in the primary deformation mode, the most forward actuator 72 may be made OFF, a tilt of the linear members 4 in a case of a collision load being obliquely input can be prevented by making the most forward actuator 72 ON as above.

Subsequently, will be described a case where the vehicle M collides with a large object (for example, a large vehicle), referring to FIG. 1. First, when the vehicle M collides with the large collision object, it is detected by, for example, four neighboring collision object detection sensors 2a to 2d out of the collision object detection sensors 2a to 2f and signals thereof are output to the controller 3. And in the controller 3 the detection signals are judged to be output from the four collision object detection sensors 2a to 2d and the collision object is determined to be large. Thus the controller 3, which has determined the collision object to be large, makes all of the linear members 4 buckle in the quintic deformation mode (see FIG. 4E) by, for example, making all of the actuators 72 shown in FIGS. 6A and 6B ON while otherwise referring to a vehicle speed.

Meanwhile, although in the description all of the linear members 4 is controlled so as to buckle in the primary and quintic deformation modes, otherwise the five pairs of the connection members arranged between two neighboring linear members 4 are selectively and appropriately connected/released, and thereby it can be made to make each of the linear members 4 buckle in the secondary, tertiary, and quartic deformation modes as shown in FIGS. 4B to 4D. In addition, it is not required to change all of the linear members 4 at the time of a collision as described above, nothing but linear members 4 of a collision portion may be controlled to be switched over to a deformation mode suitable for the collision object.

Thus in the second embodiment can be obtained a following effect:

Even when because the linear members 4 are obliquely arranged for the base member 5, a collision load is obliquely input, the tilt of the linear members 4 can be prevented.

Furthermore, because neighboring linear members 4 are connected by the connection members 71, the tilt of the linear members 4 can be surely prevented at the time of a collision.

Thus the present invention is not limited to the embodiments and practiced in various patterns.

Although in the embodiments the vehicle body rigidity control apparatus 1 and 1A and the collision object detection sensors 2a to 2f are provided within the front bumper FB, the present invention is not limited thereto, and for example, they may be provided within a rear bumper arranged at a rear portion of the vehicle M, side sills arranged at left/right of the vehicle M, and the like. In addition, although in the embodiments the vehicle body rigidity control apparatus 1 and 1A are formed substantially in a same size as the front bumper FB, the present invention is not limited thereto and a vehicle body rigidity control apparatus may be partially provided at nothing but a required portion (for example, a left side portion and right side portion within the front bumper FB) of a rigidity adjustment.

Although in the embodiments the actuators 62 and 72 are designed to be controlled, depending on the hardness of a collision object, the present invention is not limited thereto and the actuators 62 and 72 may be controlled, depending on collision patterns such as the offset collision and the full-wrap collision. In addition, a relationship between the ON/OFF of the actuators 62 and 72 and the forward/backward of the movable pins 62a and 72a is not limited to the embodiments and may be reverse.

Figure 8A:
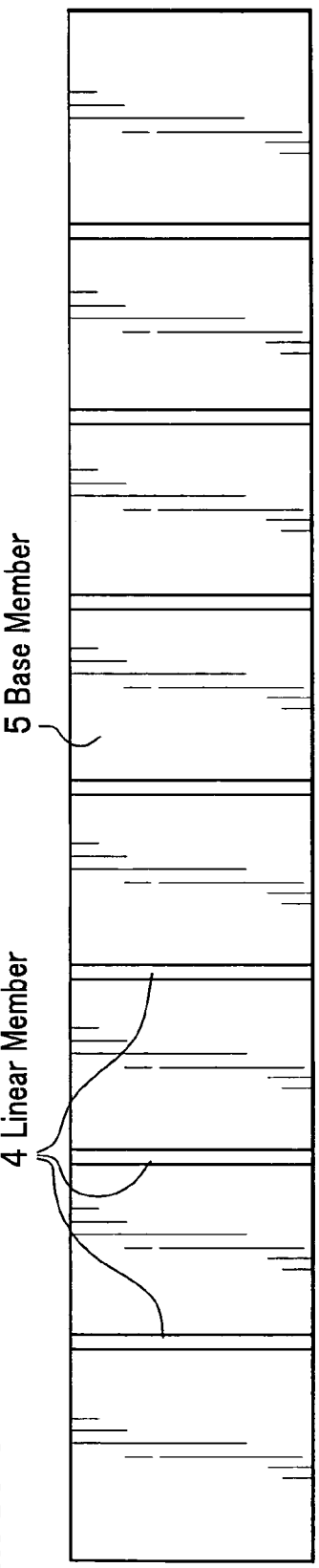
FIG. 8A is a front view showing an arrangement of the linear members in the first member.
Figure 8B:
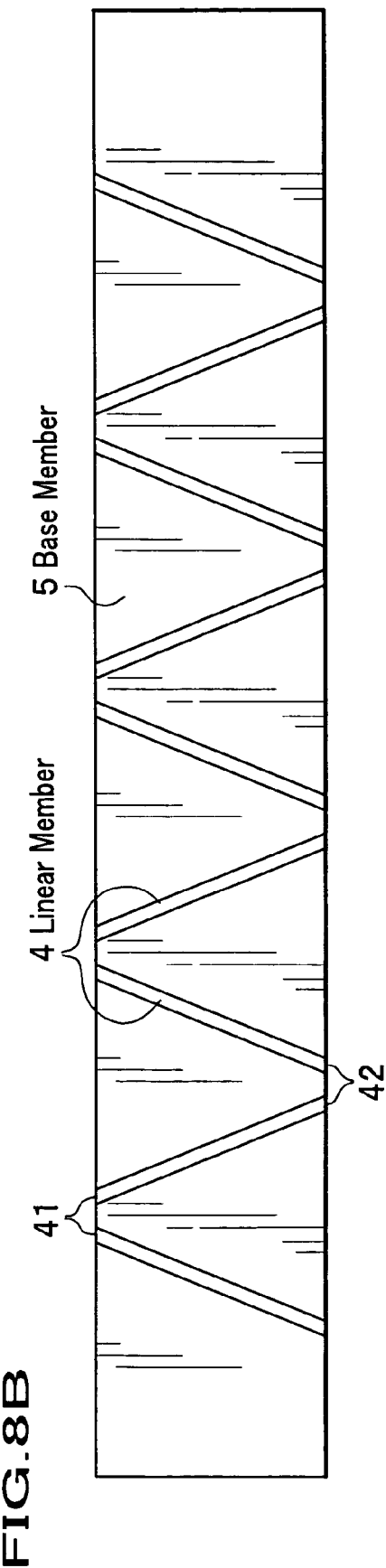
FIG. 8B is a front view showing an arrangement of the linear members in another embodiment.

Although in the first embodiment the linear members 4 are arranged so as to become parallel to the vehicle up/down direction in a state seen from a vehicle front as shown in FIG. 8A, the present invention is not limited thereto. For example, as shown in FIG. 8B, two neighboring linear members 4 may be arranged with being tilted for the vehicle up/down direction so as to become like a bottom open reverse V-shape in the state seen from the vehicle front, that is, so that the upper side portions 41 (otherwise, the lower side portions 42) near each other. Meanwhile, because isotropy can be held for an input direction of a collision load by thus arranging each of the linear members 4 like the bottom open reverse V-shape, a lateral tilt of each of the linear members 4 can be further prevented.

What is claimed is:

1. A vehicle body rigidity control apparatus comprising:
   a U-shape member of a substantially U-shape;
   a base member for supporting both ends of said U-shape member; and
   a constraint element for constraining a deformation of said U-shape member in a substantially orthogonal direction for a collision load and releasing the deformation of said U-shape member.

2. A vehicle body rigidity control apparatus according to claim 1 which comprises a plurality of said U-shape members, wherein said constraint element comprises a plate-form member, whose one end is joined to said U-shape members, and an actuator for connecting the other end of said plate-form member to said U-shape members and releasing the connection, and wherein the plate-form member is arranged inside said U-shape members.

3. A vehicle body rigidity control apparatus according to claim 1 which comprises a plurality of said U-shape members, wherein said constraint element comprises two connection members, whose one ends are joined to two neighboring U-shape members of said U-shape members, respectively, and an actuator for mutually connecting the other ends of said connection members and releasing the connection.

4. A vehicle body rigidity control apparatus according to claim 1, wherein said U-shape member is comprised of a shape memory alloy.

5. A vehicle body rigidity control apparatus according to claim 2, wherein said U-shape members are comprised of a shape memory alloy.

6. A vehicle body rigidity control apparatus according to claim 3, wherein said U-shape members are comprised of a shape memory alloy.

7. A vehicle body rigidity control apparatus according to claim 1, wherein the constraint element releases the deformation of said U-shape member when the collision load is added to the U-shape member.

8. A vehicle body rigidity control apparatus according to claim 1, wherein the constraint element comprises at least two constraint elements, and a number of released constraint elements depends on the collision load.

9. A vehicle body rigidity control apparatus according to claim 1, wherein the collision load corresponds to a size of a collision object.

* * * * *